United States Patent [19]

Asanuma et al.

[11] Patent Number: 4,725,338
[45] Date of Patent: Feb. 16, 1988

[54] PURIFICATION PROCESS OF POLYMERIZATION SOLVENT

[75] Inventors: Tadashi Asanuma, Takaishi; Tatuo Ohoka, Izumi; Minoru Hino; Nobutaka Uchikawa, both of Takaishi, all of Japan

[73] Assignee: Mitsui Toatsu Chemicals, Incorporated, Tokyo, Japan

[21] Appl. No.: 832,412

[22] Filed: Feb. 24, 1986

[30] Foreign Application Priority Data

Mar. 5, 1985 [JP] Japan .................. 60-41867

[51] Int. Cl.⁴ .................................. B01D 3/34
[52] U.S. Cl. ............................ 203/38; 203/98; 203/99; 203/DIG. 6; 203/DIG. 9; 203/DIG. 19; 526/70; 526/912
[58] Field of Search ............ 203/DIG. 9, 38, 98, 203/99, 91, 94, DIG. 6, DIG. 19, 28, 29; 159/DIG. 8; 526/70, 912

[56] References Cited

U.S. PATENT DOCUMENTS

| 2,374,272 | 4/1945 | Carpenter et al. | 526/912 |
|---|---|---|---|
| 2,844,569 | 7/1958 | Green et al. | 526/912 |
| 2,856,392 | 10/1958 | Tegge et al. | 526/912 |
| 2,860,126 | 11/1958 | Cines | 526/912 |
| 2,943,123 | 6/1960 | Ross | 526/912 |
| 3,085,998 | 4/1963 | Ross et al. | 526/912 |
| 3,123,591 | 3/1964 | Ross | 526/912 |
| 3,129,205 | 4/1964 | Rowe et al. | 526/912 |
| 3,153,027 | 10/1964 | Hagemeyer et al. | 526/70 |
| 3,652,515 | 3/1972 | Love | 526/912 |
| 3,655,520 | 4/1972 | Harkins, Jr. | 203/38 |
| 3,658,780 | 4/1972 | Scoggin | 526/912 |
| 3,783,126 | 1/1974 | Hayward et al. | 202/173 |

FOREIGN PATENT DOCUMENTS

| 0208304 | 12/1983 | Japan . | |
| 0252608 | 12/1985 | Japan . | |
| 0849232 | 9/1960 | United Kingdom | 526/912 |

*Primary Examiner*—S. Leon Bashore
*Assistant Examiner*—V. Manoharan
*Attorney, Agent, or Firm*—Oblon, Fisher, Spivak, McClelland & Maier

[57] ABSTRACT

A process for purifying a solvent suitable for use in the polymerization of an olefin in the presence of a Ziegler-Natta catalyst, which comprises feeding the polymerization solvent to a stage lower than a chimney tray of a multi-stage distillation column, said chimney tray being provided at a height between the top and bottom of the column, feeding an organoaluminum compound to a stage higher than the chimney tray, drawing out a condensate from the chimney tray, heating the condensate to produce heated vapor, introducing the heated vapor to the chimney tray or to a stage higher than the chimney tray but lower than the stage to which the organoaluminum compound has been fed, and drawing the solvent in a purified state from the top.

7 Claims, 2 Drawing Figures

4,725,338

PURIFICATION PROCESS OF POLYMERIZATION SOLVENT

BACKGROUND OF THE INVENTION

1. Field of the Invention

This invention relates to a purification process of a polymerization solvent, and specifically to a process for purifying a polymerization solvent which is to be employed upon polymerization of an olefin in the presence of a Ziegler-Natta catalyst.

2. Description of the Prior Art

It is extremely important to purify a polymerization solvent prior to its use for the polymerization of an olefin in the presence of a Ziegler-Natta catalyst, because the Ziegler-Natta catalyst is deactivated by various poisonous components such as compounds with polar groups contained therein. For this reason, its purification is usually carried out under precisely-controlled operational conditions in a distillation column of an extremely sophisticated design. It is also practiced to use an adsorbent as needed, whereby polymerization-inhibiting components are adsorbed.

Although the above-mentioned distillation-dependent purification process may be a preferable process where such polymerization-inhibiting components can be specified and their contents remain constant, it may not be able to achieve desired purification if associated polymerization-inhibiting components cannot be specified or their contents vary.

On the other hand, the process making use of an adsorbent requires an extremely high cost for the processing because the adsorbent can generally adsorb extremely little compared with its own amount and when polymerization-inhibiting components are contained at high concentrations, this process cannot treat the polymerization solvent in any large volume. Moreover, another problem is involved in an actual practice of this process on an industrial scale, that is, it is difficult to analyze whether any polymerization-inhibiting components are mixed in a treated polymerization solvent. There is thus a standing desire for the development of a simple and economical purification process.

SUMMARY OF THE INVENTION

An object of this invention is to provide an improved purification process for a polymerization solvent to be employed upon polymerization of an olefin in the presence of a Ziegler-Natta catalyst.

Another object of this invention is to provide a process for purifying a polymerization solvent, which is to be employed upon polymerization of an olefin in the presence of a Ziegler-Natta catalyst, by removing with ease polymerization-inhibiting components from the polymerization solvent.

The present invention provides the following purification process for a solvent which is suitable for use in the polymerization of an olefin in the presence of a Ziegler-Natta catalyst:

An improved process for purifying a polymerization solvent by distillation, said solvent being to be employed upon polymerization of an olefin in the presence of a Ziegler-Natta catalyst, which comprises:

feeding the polymerization solvent to a stage lower than a chimney tray of a multi-stage distillation column, said chimney tray being provided at a height between the top and bottom of the column;

feeding an organoaluminum compound to a stage higher than the chimney tray;

drawing out a condensate from the chimney tray;

heating the condensate to produce heated vapor;

introducing the heated vapor to the chimney tray or to a stage higher than the chimney tray but lower than the stage to which the organoaluminum compound has been fed; and drawing the solvent in a purified state from the top, and drawing high boiling-point components from the bottom and obtaining high boiling-point components from the condensate from the chimney tray.

DETAILED DESCRIPTION OF THE INVENTION

Figure 1:
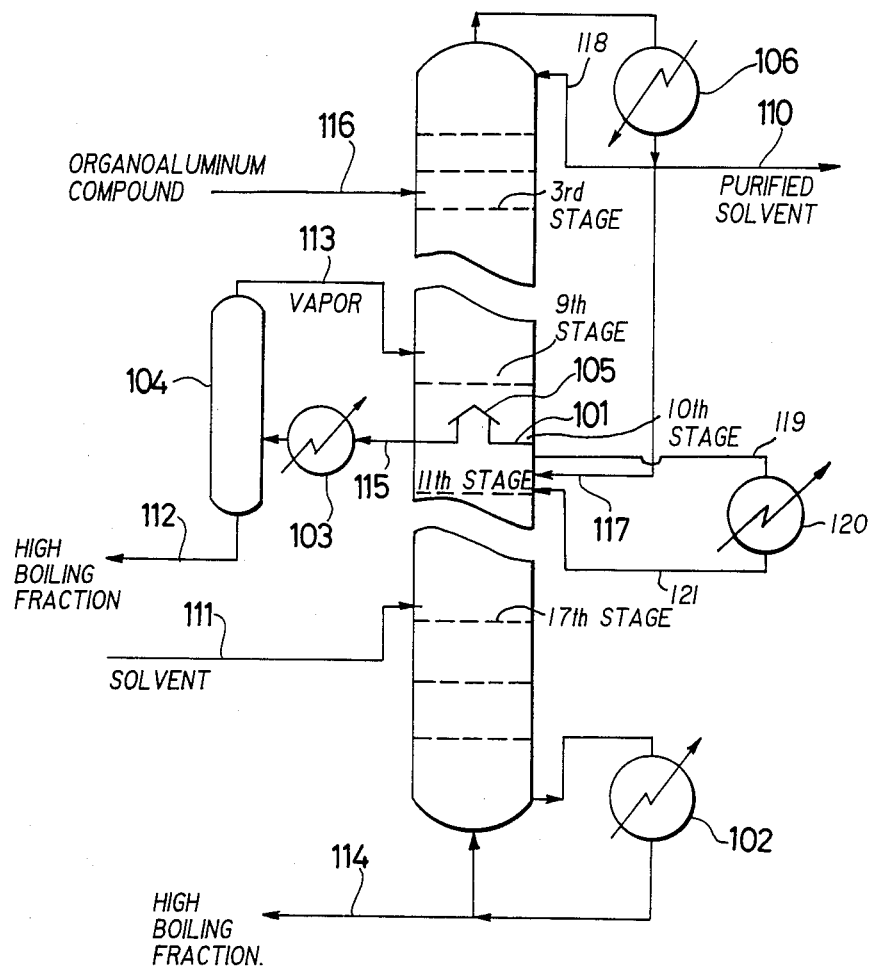
FIG. 1 illustrates one embodiment of a distillation system suitable for use in the practice of this invention.

Ziegler-Natta catalysts are well-known to those skilled in the art, to which the present invention relates. They are described, for example, in "Ziegler-Natta Catalysts and Polymerization" by John Boor, Jr. (Academic Press) as well as Journal of Macromolecular Science—Reviews in Macromolecular Chemistry and Physics, C24(3), 355–385 (1984) and ibid., C25(1), 57–97 (1985). Olefins which can be polymerized by such Ziegler-Natta catalysts in the present invention are those having preferably 2–4 carbon atoms, such as ethylene, propylene and butene-1.

No particular limitation is necessarily imposed on the polymerization solvent to be employed in the present invention. In view of its separation from the organoaluminum compound, a polymerization solvent having a boiling point of 60°–140° C. or so, such as hexane, heptane, octane, benzene, toluene, xylene, ethylbenzene, or a mixture thereof, is preferred.

These polymerization solvents include not only those routinely available on the market, the purity levels of which are relatively high, but also polymerization solvents recovered from polymerization systems. In the case of polymerization solvents recovered from polymerization systems, it is more preferable to purify them by the process of this invention after low boiling-point compounds such as unreacted monomers, e.g., ethylene, propylene, butene-1 and/or the like are removed beforehand.

Although no particular limitation is necessarily imposed on the organoaluminum compound to be used in the present invention, it is possible to use a trialkyl aluminum such as triethyl aluminum, tripropyl aluminum or triisobutyl aluminum, a dialkyl aluminum monohalide such as diethyl aluminum chloride or dipropyl aluminum chloride, an alkyl aluminum sesquihalide such as ethyl aluminum sesquichloride, an alkyl aluminum dihalide such as ethyl aluminum dichloride, an alkyl aluminum sulfate, or a mixture thereof.

Regarding the amount of the above-described organoaluminum compound to be introduced in accordance with the present invention, it is sufficient if the organoaluminum compound is added in an amount 1 to 6 times in moles polymerization-inhibiting components flowing upward from the chimney tray provided that the polymerization-inhibiting components have been known. If polymerization-inhibiting components are not known, it is necessary to change the rate of its feed to find out conditions under which polymerization-inhibiting components are no longer allowed to flow up. Alternatively, the performance of a fraction, which has been obtained from the top of a distillation column without introduction of any organoaluminum compound, is compared as a polymerization solvent with the performance of the same polymerization solvent containing known polymerization-inhibiting components to determine the contents of the polymerization-inhibiting components and the organoaluminum compound is then added in an amount 1–6 times in moles the contents of the polymerization-inhibiting components.

In order to achieve more efficient operation of trays arranged below the chimney tray in the present invention, it is also feasible to recirculate portions of the solvent drawn in a purified state from the top to stages immediately below the top through line 118 and chimney tray through line 119 or to draw out a portion of vapor from the tray immediately below the chimney tray through line 119, to cool and condense the vapor in condenser 120 and then to recirculate the resultant condensate through line 121.

By the process of this invention, such polymerization-inhibiting components are rendered harmless or converted to high boiling-point products and hence no longer allowed to rise to the top. It is thus possible to obtain with ease the polymerization solvent in a purified state from the top. Moreover, the polymerization-inhibiting components which have reached the chimney tray and bottom are drawn out of the distillation column. These polymerization-inhibiting components are therefore not caused to undergo any further decomposition, thereby preventing them from flowing upward as a polymerization-inhibiting component to the top. Accordingly, the process of this invention is expected to provide with ease a purified polymerization solvent by the addition of a small amount of an organoaluminum compound. The process of this invention is extremely useful as a process for obtaining a purified polymerization solvent on an industrial scale in a manner mentioned above.

The present invention and its effects will hereinafter be described further by the following Examples and Comparative Examples. The following Examples are given only for illustrative purpose and shall not be interpreted as limiting the present invention.

EXAMPLE 1 & COMPARATIVE EXAMPLES 1–2

Purification of commercial benzene was carried out by using a distillation system depicted in FIG. 1. The distillation system had the following structure. It had an inner diameter of 40 mm and was equipped with 20 stages. An organoaluminum compound feed line 116 was connected to the 3rd stage and the 10th stage was formed as a chimney tray equipped with a chimney 105 (of such a structure that condensed liquid was not allowed to fall down from the 10th stage). A condensate draw line 115 was connected to the 10th stage. A feed line 111 for a solvent to be purified was coupled to the 17th tray. A reboiler 102 was provided to permit heating of a bottom liquid. A draw line 114 for the bottom liquid was provided at the bottom. The condensate from the condensate draw line 115 was charged into an evaporator 104 by way of a heater 103. A draw line 112 was provided at the evaporator 104 in order to draw out high boiling-point fractions. A vapor feed line 113 was connected to the 9th stage so as to introduce vapor from the evaporator 104 into the distillation column.

On the other hand, vapor drawn out from the top was then condensed by a condenser 106 and portions of the condensed solvent were recirculated to the top and 11th stage. The remaining condensed solvent was obtained as a purified solvent through a line 110.

The following operation was performed in Example 1 and Comparative Examples 1–2. The commercial benzene was introduced at 30 ml/min. through the feed line 111. In Example 1, triethyl aluminum was introduced at 0.006 ml/min. via the feed line 116. In Comparative Example 1, triethyl aluminum was not introduced. High boiling-point fractions were drawn out of the evaporation column at 0.2 ml/min. through the line 114 and at 0.2 ml/min. through the line 112, and the distillation was performed at a reflux ratio of 0.2 to obtain purified benzene at 29 ml/min. from the top.

Analysis of Purified Benzene (A) Preparation of Catalyst Slurry

There was provided a vibrating ball mill equipped with two grinding pots each of which had an internal volume of 900 ml and contained 80 steel balls having a diameter of 12 mm. In the pots, 30 g/pot of magnesium chloride, 3 ml/pot of ethyl orthoacetate and 6 ml/pot of 1,2-dichloroethane were placed. The magnesium chloride was ground for 40 hours. This procedure was repeated twice. After stirring eighty grams of the thus-obtained ground mixture together with 500 ml of titanium tetrachloride at 80° C. for 2 hours in a 2-l round bottom flask, the contents were allowed to stand and the resultant supernatant was removed. Thereafter, 1 l of n-heptane was added and the resultant mixture was stirred for 15 minutes. The contents were allowed to stand and the resultant supernatant was removed. This washing procedure was repeated 7 times, followed by a further addition of 500 ml of n-heptane to prepare a slurry of solid transition metal catalyst.

(B) Polymerization:

A polymerization reaction was conducted by using the above-prepared slurry of transition metal catalyst. In an autoclave having an internal volume of 5 l, 30 mg of the above slurry of transition metal catalyst, 0.06 ml of methyl toluylate, 0.128 ml of diethyl aluminum chloride and 0.08 ml of triethyl aluminum charged. Charged further as diluting benzene was a benzene sample purified after adding triethyl aluminum thereto (Example 1), another benzene sample purified without addition of triethyl aluminum (Comparative Example 1) or commercial benzene as it was (Comparative Example) in an amount of 50 ml. The diluting benzene was mixed with the contents of the autoclave. Thereafter, 1.5 kg of propylene and 1.5 Nl of hydrogen were added, followed by their polymerization at 75° C. for 2 hours. Unreacted propylene was then purged and the contents were dried under reduced pressure (for 6 hours at 20 mmHg) to obtain powder. Results are shown in Table 1.

Example 2 and Comparative Example 3

(i) Preparation of Catalyst Slurry:

To 50 l of n-heptane, were added 50 solids grams of the slurry of solid transition metal catalyst obtained in Example 1, 214 ml of diethyl aluminum chloride and 100 ml of methyl toluylate so as to obtain a catalyst slurry. On the side, 133 ml of triethyl aluminum was added to 20 l of n-heptane.

Figure 2:
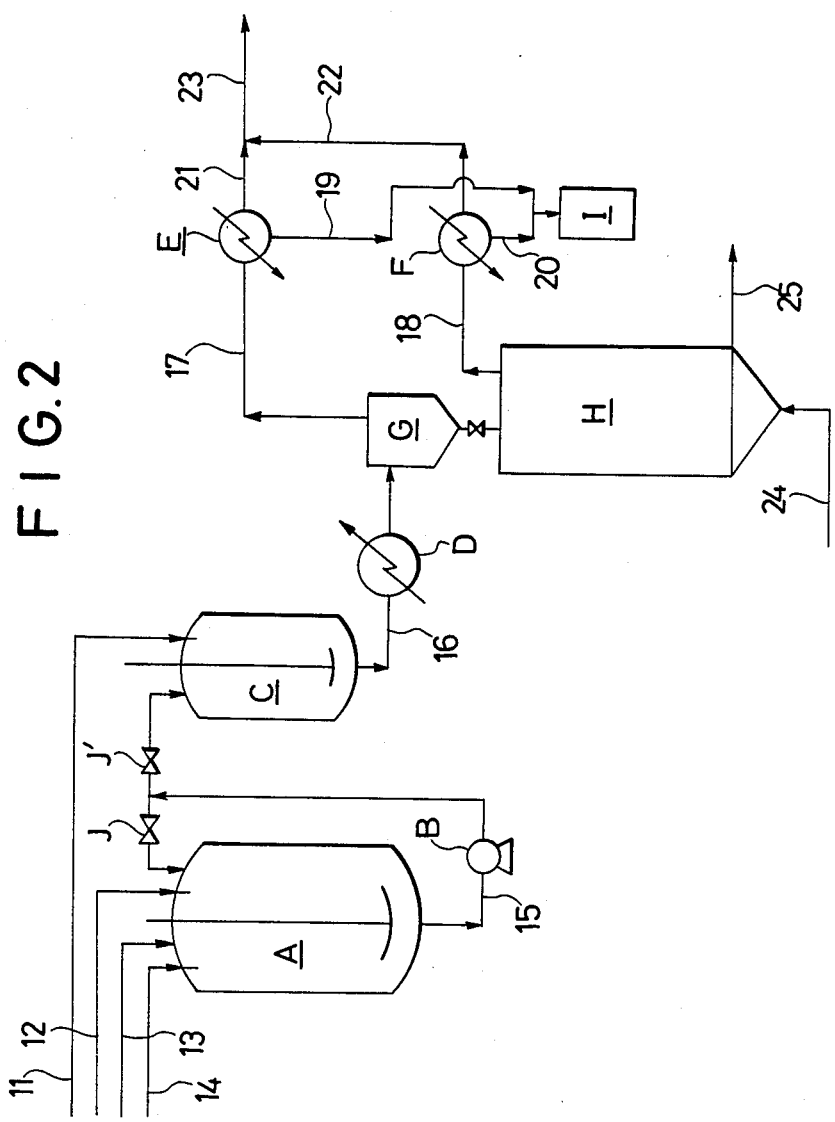
FIG. 2 is a flow sheet showing one embodiment of a polymerization process in which the process of this invention is to be incorporated.

(ii) Polymerization:

Polymerization of propylene was carried out by using an apparatus depicted in FIG. 2.

The catalyst slurry obtained in the above procedure (i) and a triethyl aluminum solution were charged respectively at 3 g/hr. in terms of the solid catalyst and 8 ml/hr. in terms of triethyl aluminum through lines 13 and 14 into a polymerization reactor A having an internal volume of 500 l. In addition, propylene was also fed at 80 kg/hr. and its polymerization was conducted at 70° C. During the polymerization, n-heptane was charged at 5 l/hr. in order to flash pumps and valves.

A portion of a polypropylene-containing slurry obtained in the polymerization reactor A was recirculated at 4,800 kg/hr. by a pump B through a line 15 to the reactor A. Another portion of the polypropylene-containing slurry was transferred at 80 kg/hr. to an autoclave C (internal volume: 200 l). Designated at letters J,J' are flow control valves respectively. Diethylene glycol monomethyl ether was introduced as a catalyst deactivator at 100 ml/hr. to the autoclave C by way of a line 11.

A polypropylene-containing slurry which had been discharged from the autoclave C was delivered through a line 16 to a heating tube D, in which the slurry was heated. The thus-heated slurry was then fed to a cyclone G, in which it was separated into polypropylene and vapor such as n-heptane. The polypropylene was introduced in a drier H, and propylene which had been heated to 90° C. was introduced via a line 24 to dry the polypropylene, thereby obtaining polypropylene powder at 30 kg/hr. through a line 25.

The vapor which had been separated by the cyclone G was fed through a line 17 to a heat exchanger E, in which it was cooled to 30° C. under 0.1 kg/cm$^2$(G) to recover a condensate a majority of which was composed of n-heptane. On the other hand, the n-heptane containing propylene from the drier was cooled to 30° C. under 0.1 kg/cm$^2$(G) in a heat exchanger F, thereby recovering a condensate a majority of which was composed of n-heptane. The condensates which had been recovered respectively in the heat exchangers E and F and contained n-heptane as their major constituents were collected in a tank I by way of lines 19 and 20 respectively. The collection rate was 9.6 l/hr. Gases which had not been caused to condense in the heat exchangers E and F were guided respectively through lines 21,22 and then via a line 23 to an unillustrated propylene recovery system.

The condensate which had been recovered in the tank I and contained n-heptane as its major constituent was purified in the same manner as in Example 1. However, purified heptane was drawn out at 5 ml/min. from the top through line 118 and then returned to the distillation column by way of the line 117, and the operation of the distillation system was effected in such a way that the ascending vapor stream was increased and stabilized to draw purified heptane at 29 ml/min. from the top. In addition, purified heptane (Recovered Liquid 1) was obtained by changing the feed rate of triethyl aluminum to 0.008 ml in Example 2 while purified n-heptane (Recovered Liquid 2) was obtained from the top without charging triethyl aluminum in Comparative Example 3.

(iii) By using Recovered Liquids 1 and 2, solid transition metal catalysts were prepared in the same manner as in the procedure (A) of Example 1 except for the use of ground mixtures each in an amount of 10 g.

(iv) Polymerization Reaction:

Polymerization was conducted by using the solid transition metal catalyst obtained in the above procedure (iii) and as a control, that obtained in the above procedure (i). The polymerization reaction was conducted in the following manner. Namely, a mixture of 30 mg of the solid transition metal catalyst, 0.06 ml of methyl toluylate, 0.128 ml of diethyl aluminum chloride, 0.08 ml of triethyl aluminum and 50 ml of n-heptane [the n-heptane employed in the procedure (A) of Example 1 was employed for both catalysts] as a diluent was charged in an autoclave having an internal volume of 5 l, followed by further addition of 1.5 kg of propylene and 1.5 Nl of hydrogen. After conducting its polymerization at 75° C. for 2 hours, unreacted propylene was purged and the contents were dried at 60° C. for 6 hours under reduced pressure (20 mmHg) to obtain powder. Results are also summarized in Table 1.

EXAMPLE 3 & COMPARATIVE EXAMPLE 4

By using highly-active titanium trichloride "TGY-24" (trade name; product of Marubeni-Solvay Corporation; composition: 92% TiCl$_3$ and 8% high b.p. ethers) as a solid transition metal catalyst, polymerization of propylene was conducted in an apparatus similar to that employed in the procedure (ii) of Example 2.

To prepare a catalyst slurry, 100 g of the above titanium trichloride, 100 l of toluene and 800 ml of diethyl aluminum chloride were mixed. Propylene was added in an amount of 500 g to the above mixture and the contents were stirred at 40° C. for 1 hour to polymerize 5 g of propylene per gram of titanium trichloride. Thereafter, 0.5 ml of diethylene glycol monoisopropyl ether was added to obtain the intended catalyst slurry. Polymerization was conducted in the same manner as in the procedure (ii) of Example 2 except that the catalyst slurry was charged at 7 g/hr. in terms of solid transition metal catalyst and triethyl aluminum was not charged. During the polymerization, toluene was also charged to flash the pumps and valves. Condensate was recovered at 12.8 l/hr. in the tank I.

The thus-recovered condensate a majority of which was composed of toluene obtained in the same manner as in the procedure (ii) of Example 2 as Recovered Liquid 3 in Example 3 and as Recovered Liquid 4 in Comparative Example 4. In Example 3, 0.01 ml of diethyl aluminum chloride was added as an organoaluminum compound. However, diethyl aluminum chloride was not charged in Comparative Example 4.

Each of the thus-recovered toluene samples was then added with 100 g/l of titanium trichloride catalyst and the resultant mixture was stirred for 20 hours. Polymerization was then conducted by using the thus-prepared catalyst slurry. A catalyst slurry composed of 100 mg of titanium trichloride, 0.8 ml of diethyl aluminum chloride and 100 ml of toluene (the toluene employed in the preceding polymerization was used in both Example 3 and Comparative Example 4) as a diluent was charged, followed by further addition of 1.5 kg of propylene and 3 Nl of hydrogen. Its polymerization was then conducted at 70° C. for 3 hours to obtain powder in the same manner as in the procedure (iv) of Example 2. Results are also shown in Table 1.

TABLE 1

| Ex. & Comp. Ex. | Inert hydrocarbon employed | Yield of polymer in grams per gram of solid transition metal catalyst | Physical properties of powder | | |
|---|---|---|---|---|---|
| | | | Int. viscosity measured in tetralin soln. of 135° C. | Bulk specific gravity g/ml | % of residue after extraction in boiling n-heptane for 6 hours. |
| Ex. 1 | Purified benzene | 11,050 | 1.67 | 0.43 | 96.7 |
| Comp. Ex. 1 | Distilled benzene | 7,800 | 1.58 | 0.42 | 96.0 |
| Comp. Ex. 2 | Commercial benzene | 7,700 | 1.62 | 0.41 | 96.2 |
| Ex. 2 | Recovered Liquid 1 | 10,950 | 1.67 | 0.42 | 96.5 |
| Comp. Ex. 3 | Recovered Liquid 2 | 3,900 | 1.52 | 0.41 | 96.2 |
| Ex. 3 | Recovered Liquid 3 | 9,750 | 1.95 | 0.50 | 94.6 |
| Comp. Ex. 4 | Recovered Liquid 4 | 4,850 | 1.89 | 0.49 | 94.3 |

What is claimed is:

1. A process for purifying a polymerization solvent containing polymerization inhibiting components, by distillation in a multi-stage distillation column having a chimney tray, comprising the steps of:
   feeding said polymerization solvent to a stage lower than said chimney tray, said chimney tray being provided at a height between the top and bottom of said column and said polymerization solvent being substantially free of polymerization catalyst and unreacted monomer,
   feeding an organoaluminum compound to a stage higher than said chimney tray;
   drawing out a condensate comprising said organoaluminum compound from said chimney tray, heating said condensate and subjecting said condensate to a liquid-vapor separation to separate the heated vapor;
   introducing said heated vapor at the stage containing said chimney tray or any stage higher than said chimney tray but below the stage at which said organoaluminum compound is fed; and
   drawing purified solvent vapor from the top of said column and drawing high boiling components from the bottom of said column and from said liquid-vapor separation step.

2. A process as claimed in claim 1, wherein the polymerization solvent has a boiling point of 60°-140° C.

3. A process as claimed in claim 2, wherein the polymerization solvent is hexane, heptane, octane, benzene, toluene, xylene, ethylbenzene or a mixture thereof.

4. The process of claim 1, wherein said organoaluminum compound is a tri($C_2$–$C_4$ alkyl) aluminum, di($C_2$–$C_4$ alkyl) aluminum monohalide, $C_2$–$C_4$ alkyl aluminum sesquihalide, $C_2$–$C_4$ alkyl aluminum dihalide, alkyl aluminum sulfate or a mixture thereof.

5. The process of claim 1, wherein a portion of said purified solvent vapor is drawn from the top of said column, condensed and is recirculated to the top stage of said column and to the stage below said chimney tray.

6. The process of claim 1, wherein solvent vapor is drawn from stage below said chimney tray, condensed and recirculated to the stage below said chimney tray.

7. The process of claim 1, wherein said polymerization solvent has been separated from a Ziegler-Natta olefin polymerization reaction mixture and is substantially free of unreacted monomer.

* * * * *